No. 837,415. PATENTED DEC. 4, 1906.
H. F. MARRIOTT.
MEANS FOR SURVEYING BORE HOLES.
APPLICATION FILED APR. 29, 1905.

2 SHEETS—SHEET 1.

Attest:
C. S. Middleton
Edward N. Sartore

Inventor:
Hugh F. Marriott,
by Richards & Co
Att'ys.

No. 837,415. PATENTED DEC. 4, 1906.
H. F. MARRIOTT.
MEANS FOR SURVEYING BORE HOLES.
APPLICATION FILED APR. 29, 1905.
2 SHEETS—SHEET 2.
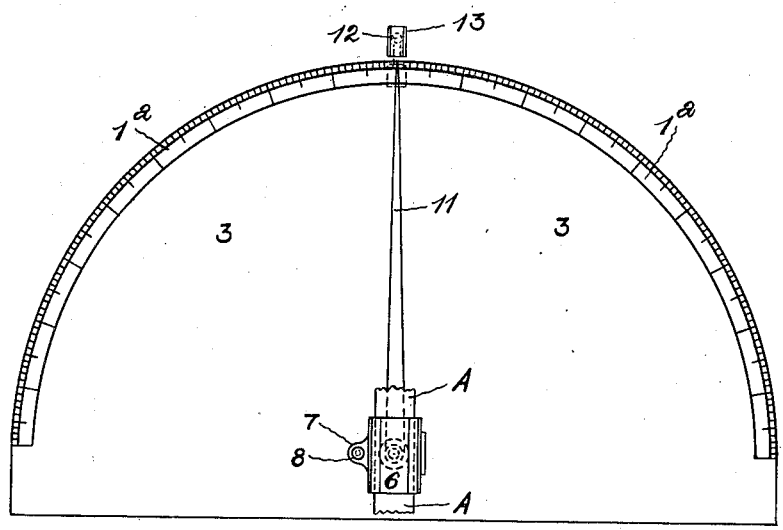
Fig. 3.
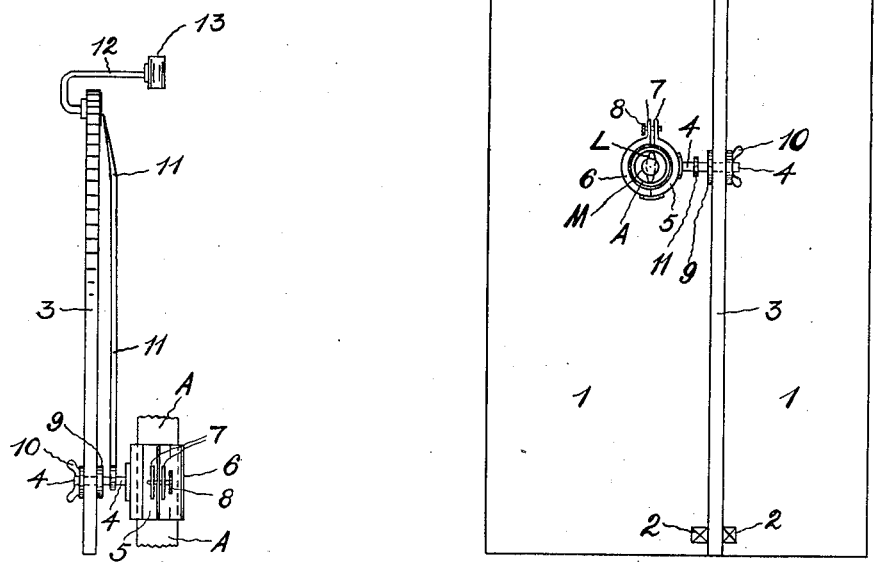
Fig. 5.
Fig. 4.
Witnesses:
Inventor:
Hugh Frederick Marriott
by Chas Ovendale
Attorney

UNITED STATES PATENT OFFICE.

HUGH FREDERICK MARRIOTT, OF PARKTOWN, TRANSVAAL.

MEANS FOR SURVEYING BORE-HOLES.

No. 837,415.  Specification of Letters Patent.  Patented Dec. 4, 1906.

Original application filed August 30, 1904, Serial No. 222,777. Divided and this application filed April 29, 1905. Serial No. 259,040.

*To all whom it may concern:*

Be it known that I, HUGH FREDERICK MARRIOTT, a subject of the King of Great Britain, residing at Parktown, near Johannesburg, Transvaal, South Africa, have invented certain new and useful Improvements in Means for Surveying Bore-Holes, of which the following is a specification.

The present invention has reference to devices for surveying bore-holes, and more especially to an instrument for determining the direction of and measuring the amount of dip.

In a prior application for patent filed on the 30th day of August, 1904, under Serial No. 222,777, and of which this case is a division, I describe an instrument in which electricity is employed for liquefying at the point to be surveyed a solid contained within the instrument, the solid serving on resolidification to retain in its recording or indicating position a magnetic compass and mirror from which the desired information or reading may be obtained after the withdrawal of the instrument from the bore-hole.

My present improvements have especial reference to this form of instrument, and they relate to the construction and arrangement of the magnetic compass and mirror.

In the arrangement described and illustrated in my prior application, Serial No. 222,777, the pin which forms the support for the magnetic compass is rigidly attached to the bottom plug, which closes the lower end of the tube or cylinder in which the compass is contained.

Now the object of this invention is to improve this construction and to increase the sensitiveness and efficiency of the instrument and to construct it so that the compass is not so liable to displacement when the instrument is brought into use.

The improvements will now be described in detail by aid of the accompanying sheet of drawings, in which sufficient of the instrument is illustrated to fully illustrate the improvements.

Figure 2:
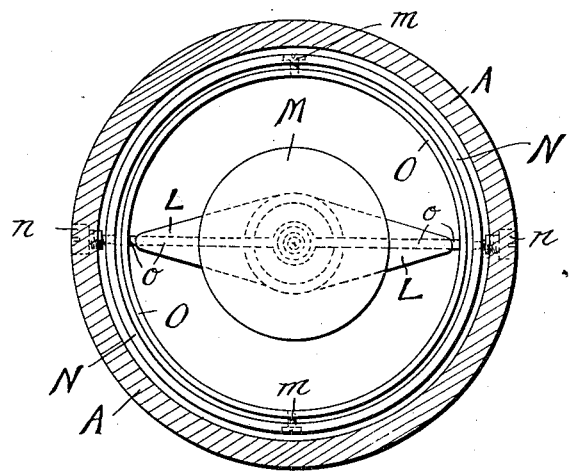
Figure 1:
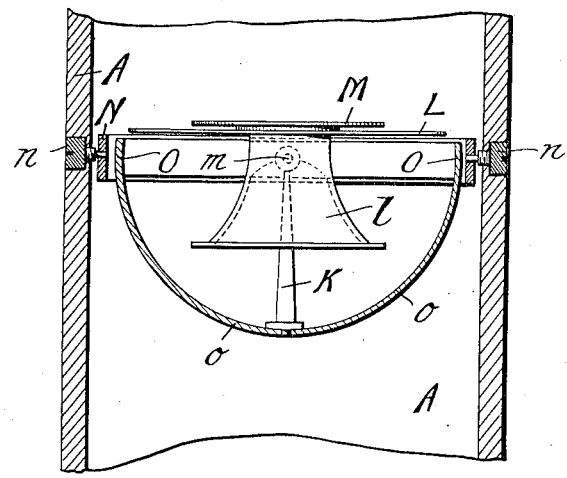

In the drawings, Figure 1 represents a vertical part-sectional elevation of the tube and magnetic compass arranged and fixed therein, and Fig. 2 is a plan. Fig. 3 is an elevation of the device for reading the declination of the bore-hole from the mirror with the base-board removed. Fig. 4 is a plan of Fig. 3 with the base-board in position, and Fig. 5 is a side elevation also with the base-board removed.

A designates the tube or hollow cylinder which serves for inclosing the several parts of the instrument. This and the several other parts of the instrument, with the exception of the magnetic compass, may be of the construction illustrated and described in my previous application, Serial No. 222,777.

L represents the magnetic needle, which is attached to or constructed in one piece with the hollow, conical, or bell-shaped base $l$. M is the mirror, fixed to the top of the magnetic needle L. The magnetic needle L is balanced upon the point of the vertically-disposed pin K. The pin K is carried by a semicircular band $o$, which band $o$ at its extremities is attached to an inner ring O. Round the ring O is arranged an outer and concentric ring N, to which the inner ring O is pivotally attached by the two pivots or pins $m$, located diametrically opposite each other. The outer ring N is pivotally carried by screws $n$, screwed through the tube A into the ring N. The pivots formed by the screws $n$ for the ring N are also arranged diametrically opposite each other and in a plane at right angles to the plane of the pivots $m$ for the inner ring O.

By the construction above described the concentric rings N O being free to move on the pivots $n$ $m$ in two planes at right angles the pin K is thereby maintained in a vertical position in relation to the magnetic needle L and mirror M.

In like manner to the compass described in my prior application, Serial No. 222,777, the mirror M being fixed to the magnetic needle L, the declination of said mirror from the horizontal (a plane at right angles to the longitudinal axis of the tube A) represents the direction of and measures the dip, which can be easily determined.

In Figs. 3, 4, and 5, illustrating the arrangement for determining from the mirror the declination of the bore-hole, 1 represents a horizontal board which has fixed to it at two opposite ends two uprights or supports 2, which support a vertical board 3, formed with a semicircular upper edge 1ª, marked with degrees like a protractor. At the center of the protractor 3 and in proximity to the bottom edge is fixed a clamping device consisting of a spindle 4, carrying one half 5 of a clamp in which the instrument, consisting of the compass-needle L, mirror M, &c., in its holder, is clamped by means of the other half 6 of the clamp. The instrument is placed with the magnetic needle L and mirror M at the top. The halves 5 6 of the clamp are constructed with lugs 7, through which is screwed a tightening-screw 8 for securing the instrument.

9 is a washer placed on the spindle 4 at one side of the vertical board 3, and 10 a wing-nut screwed onto the threaded extremity of the spindle 4 at the other side of the board 3. The wing-nut 10 serves for clamping the clamp and instrument to the protractor. On the needle 4, at the foot of the board 3, is fixed a pointer 11, which rotates with the spindle 4 and serves for determining the number of degrees of dip or declination of the bore-hole.

To the top of the board 3, at the center or immediately above the hole provided for the clamp-spindle 4, is a bracket 12, which is bent over to the front of the protractor. To the outer extremity of the bracket 12 is fixed a tubular eyepiece 13, to the inside of which are fixed cross-wires the point of intersection of which coincides with the center of the clamp 5 6 when the pointer 11 is vertical.

In using this device the tube A is placed and fixed in the clamp 5 6 and the pointer 11 placed perpendicular. The operator then looks through the eyepiece 13 and moves the pointer 11 until the reflection of the eye is seen through the eyepiece 13 in the center of the mirror M. The mirror is then horizontal, and when in this position the pointer 11 indicates on the protractor 3 in degrees read from the vertical the declination of the hole. It may be clamped in this position by the wing-nut 10.

What I claim as my invention, and desire to protect by Letters Patent, is—

In an instrument of the nature indicated for surveying bore-holes, in combination, the tube or hollow cylinder A, the magnetic needle L formed with the hollow, conical or bell-shaped base $l$, the mirror M attached to the needle L, the outer ring N and pivots $n$ pivotally supporting it at two diametrically opposite points in the tube A, the inner concentric ring O and the pivots $m$ pivoting it to the outer ring N at two diametrically opposite points and at right angles to the pivots $n$, the semicircular band $o$ and the vertical pin K fixed thereto said pin projecting into the recess in the under side of the conical or bell-shaped base $l$ to support the needle L and mirror M, substantially as described.

In witness whereof I have hereunto set my hand in the presence of two subscribing witnesses.

HUGH FREDERICK MARRIOTT.

Witnesses:
CHAS. OVENDALE,
R. OVENDALE.